United States Patent
Liao et al.

(10) Patent No.: US 11,786,891 B2
(45) Date of Patent: Oct. 17, 2023

(54) PROCESS FOR RECOVERING QUATERNARY SALT BROMINATION CATALYST

(71) Applicant: DDP SPECIALTY ELECTRONIC MATERIALS US, LLC, Wilmington, DE (US)

(72) Inventors: Longyan Liao, Shanghai (CN); Shari Kram, Midland, MI (US); Mark Rickard, Midland, MI (US); Yiyong He, Midland, MI (US); John Hull, Jr., Midland, MI (US)

(73) Assignee: DDP SPECIALTY ELECTRONIC MATERIALS US, LLC, Wilmington, DE (US)

( * ) Notice: Subject to any disclaimer, the term of this patent is extended or adjusted under 35 U.S.C. 154(b) by 0 days.

(21) Appl. No.: 17/748,327

(22) Filed: May 19, 2022

(65) Prior Publication Data

US 2022/0370994 A1    Nov. 24, 2022

Related U.S. Application Data

(60) Provisional application No. 63/192,285, filed on May 24, 2021.

(51) Int. Cl.
| | | |
|---|---|---|
| *B01J 31/40* | (2006.01) | |
| *B01J 31/02* | (2006.01) | |
| *B01J 38/42* | (2006.01) | |
| *B01J 38/48* | (2006.01) | |
| *C08F 297/04* | (2006.01) | |

(52) U.S. Cl.
CPC ........... *B01J 31/40* (2013.01); *B01J 31/0271* (2013.01); *B01J 38/42* (2013.01); *B01J 38/48* (2013.01); *C08F 297/04* (2013.01); *B01J 2231/32* (2013.01); *B01J 2531/002* (2013.01); *C08F 2810/00* (2013.01)

(58) Field of Classification Search
CPC . B01J 31/40; Y02P 20/584; C08F 6/02; C08F 8/20; C08F 297/04
See application file for complete search history.

(56) References Cited

U.S. PATENT DOCUMENTS 7,851,558 B2    12/2010    King

FOREIGN PATENT DOCUMENTS

| CN | 112 079 944 A | 12/2020 |
| JP | H09 227625 A | 9/1997 |
| WO | 91/13915 A1 | 9/1991 |
| WO | 2008/021417 A | 2/2008 |
| WO | 2008/021418 A | 2/2008 |
| WO | 2009/126531 A | 10/2009 |
| WO | 2010/021906 A | 2/2010 |
| WO | 2010/127091 A1 | 11/2010 |

OTHER PUBLICATIONS

Nishida et al. "Oxidation using quaternary ammonium polyhalides VII. Oxidation of primary amines and hydrazo compounds by use of benzyltrimethylammonium tribromide." Technology reports of the Yamaguchi University 4 (1990): 309-312. (Year: 1990).*
Halasa, A.F, in Polymer, vol. 46, p. 4166 (2005).
Halasa, A.F., in Journal of Polymer Science (Polymer Chemistry Edition), vol. 14, p. 497 (1976).
Hsieh and Quirk in chapter 9 of "Anionic Polymerization Principles and Practical Applications", Marcel Dekker, Inc., Hew York, 1996.
PCT International Search Report for Application No. PCT/US2022/029977; J. Balmer, Authorized Officer; ISA/EPO; dated Oct. 21, 2022.

* cited by examiner

*Primary Examiner* — Mark S Kaucher

(57) ABSTRACT

Quaternary ammonium tribromides and quaternary phosphonium tribromides are recovered from an organic solvent by washing with an aqueous hydrazine solution. The hydrazine reacts to form nitrogen, hydrobromic acid and a quaternary ammonium or quaternary phosphonium monobromide. The hydrobromic acid and quaternary ammonium or quaternary phosphonium migrate to the aqueous phase, thereby effecting the removal of the tribromides from the organic solvent. The hydrobromic acid can be neutralized with a quaternary ammonium or quaternary phosphonium hydroxide to produce a quaternary ammonium or quaternary phosphonium monobromide. The monobromides produced can be reacted with elemental bromine to regenerate a tribromide brominating agent.

12 Claims, No Drawings

PROCESS FOR RECOVERING QUATERNARY SALT BROMINATION CATALYST

BACKGROUND OF THE INVENTION

Field of the Invention

The present invention relates to a process for recovering quaternary salt bromination catalysts from an organic solvent.

Description of Related Art

Quaternary ammonium tribromide salts and quaternary phosphonium tribromide salts are useful brominating agents for brominating polymers (such as butadiene polymers) that contain aliphatic carbon-carbon double and triple bonds. See, e.g., WO 2008/021417, WO 2008/021418 and WO 2010/021906. The process is performed with the starting polymer dissolved in an organic solvent. The tribromide salts are converted to the corresponding monobromides as the polymer is brominated. The monobromides are water-soluble and can be removed from the organic phase by aqueous extraction. The monobromides can be combined with elemental bromine to regenerate the tribromide, so it is important economically to recover those monobromides and recycle them back through the process. A highly selective bromination of aliphatic carbon-carbon unsaturation is achieved, leaving any aromatic rings that may be present essentially unaffected. Brominated butadiene polymers made in this way tend to have good thermal characteristics and can be used, for example, as flame retardant additives for thermoplastic polymers such as polystyrene.

It is beneficial to operate the process using a small excess of the tribromide brominating agent, as doing so increases bromination rates and the extent to which aliphatic carbon-carbon unsaturation on the starting polymer become brominated. Unreacted tribromide brominating agent is soluble in the organic solvent but not in an aqueous medium, so it tends to remain with the organic phase and with the brominated polymer when it is recovered. This is undesirable from several standpoints.

For that reason, residual brominating agent remaining in the organic phase is usually quenched to convert it to water-soluble species that can be removed from the organic phase through aqueous extraction. The quenching agent of choice has been sodium bisulfite, which upon reaction with the tribromide produces a mixture of sodium bisulfate, hydrobromic acid and the quaternary ammonium or quaternary phosphonium monobromide, all of which are water-soluble and easily extracted. Unfortunately, it is difficult to separate the monobromides from the other by-products, and so this mixture is usually sent to a waste stream and the valuable quaternary ammonium monobromides or quaternary phosphonium monobromides are lost.

Accordingly, a better method for removing residual quaternary ammonium or quaternary phosphonium tribromides from an organic solvent is wanted. Such a method would permit quaternary ammonium or quaternary phosphonium values to be recovered in a form that permits them to be re-used in a bromination process. In addition, such a process preferably would allow for the recovery of bromine so it too can be re-used in a bromination process.

BRIEF SUMMARY OF THE INVENTION

This invention relates to a process for removing a quaternary ammonium tribromide or quaternary phosphonium tribromide from an organic solvent, comprising a) a step of washing an organic solvent containing the quaternary ammonium tribromide or quaternary phosphonium tribromide with an aqueous hydrazine solution in an amount sufficient to provide at least 0.25 moles of hydrazine per mole of quaternary ammonium tribromide or quaternary phosphonium tribromide in the organic solvent, to produce an aqueous phase containing hydrobromic acid and a quaternary ammonium monobromide or quaternary phosphonium monobromide corresponding to the quaternary ammonium tribromide or quaternary phosphonium tribromide and then b) a step of separating the aqueous phase from the organic solvent.

DETAILED DESCRIPTION OF THE INVENTION

This invention in one aspect is a process for removing a quaternary ammonium tribromide or quaternary phosphonium tribromide from an organic solvent, comprising a) a step of washing an organic solvent containing the quaternary ammonium tribromide or quaternary phosphonium tribromide with an aqueous hydrazine solution in an amount sufficient to provide at least 0.25 moles of hydrazine per mole of quaternary ammonium tribromide or quaternary phosphonium tribromide in the organic solvent, to produce an aqueous phase containing hydrobromic acid and a quaternary ammonium monobromide or quaternary phosphonium monobromide corresponding to the quaternary ammonium tribromide or quaternary phosphonium tribromide and then b) a step of separating the aqueous phase from the organic solvent.

This process is an economical and efficient method for removing the tribromides from the organic solvent. The reaction products are nitrogen, which can be separated from the aqueous phase using any convenient gas/liquid separation method; the monobromide, which can be recovered and rebrominated for re-use as a brominating agent, and hydrobromic acid, which if desired can be neutralized to recover bromine values that also can be re-used in a bromination process. All of those reaction products are water-soluble and partition almost exclusively to the aqueous phase, leading to an excellent separation of the tribromides from the organic solvent.

In a preferred embodiment, the organic solvent contains a brominated polymer, and the process further includes a step c) of, after step a), recovering the brominated polymer from the organic solvent.

The process also may comprise after step a), a step d) of neutralizing hydrobromic acid in the aqueous phase with a quaternary ammonium hydroxide or quaternary phosphonium hydroxide to produce a corresponding quaternary ammonium monobromide or quaternary phosphonium monobromide. In such embodiments, bromine is recovered in the form of the quaternary ammonium monobromide or quaternary phosphonium monobromide. The monobromide can be contacted with additional bromine to regenerate the corresponding tribromide, which in turn can be used in subsequent bromination reactions.

In yet other preferred embodiments, the process further comprises e) a step of combining a quaternary ammonium monobromide or quaternary phosphonium monobromide obtained in step a) and/or step d) with elemental bromine to regenerate a quaternary ammonium tribromide or quaternary phosphonium tribromide.

The process may further comprise a further step f) of brominating an organic polymer having aliphatic carbon-carbon double and/or triple bonds by contacting the organic polymer with a regenerated quaternary ammonium tribromide or quaternary phosphonium tribromide obtained in step e).

Processes for brominating an organic polymer that contains aliphatic carbon-carbon double and/or triple bonds using a quaternary ammonium or quaternary phosphonium tribromide are generally described, for example, in U.S. Pat. No. 7,851,558, WO 2008/021417, WO 2008/021418, WO 2009/126531 and WO 2010/021906. In such processes, a starting polymer containing aliphatic carbon-carbon unsaturation (i.e., a site at which adjacent carbon atoms are double or triply bonded to each other, and those double or triple bonds do not from part of a conjugated system or aromatic ring structure) is contacted with a quaternary ammonium tribromide and/or a quaternary phosphonium tribromide brominating agent to brominate some or all of the aliphatic carbon-carbon unsaturation. It is usually advantageous to use 0.5 to 5 moles of the tribromide brominating agent per mole of aliphatic carbon-carbon unsaturation that is to be brominated; a more suitable amount is about 0.9 to about 2.5 moles/mole and an even more suitable amount is 1 to 1.5 moles/mole.

The reaction takes place with the starting polymer being dissolved and/or dispersed in an organic solvent, which preferably is water-immiscible. By "water-immiscible", it is meant the material is soluble in water to the extent of no more than 5 grams, preferably no more than 2 grams, per liter of water at 25° C. Bromination temperatures can range from −20 to 100° C., are preferably 0 to 85° C. and especially 10 to 40° C. The reaction produces a quaternary ammonium monobromide and/or quaternary phosphonium monobromide that corresponds to the tribromide brominating agent after removal of two atoms of bromine.

The starting organic polymer has at least one site of aliphatic carbon-carbon unsaturation and may have any higher number thereof.

Polymers and copolymers of conjugated diene monomers, especially homopolymers and copolymers of butadiene, are a preferred class of substrates. A copolymer of a conjugated diene should contain at least 10% by weight polymerized conjugated diene. A copolymer can be a random, block or graft type and will contain repeating units formed by polymerizing another monomer. Such other monomers include vinyl aromatic monomers as described more fully below, olefins such as ethylene and propylene, and acrylate or acrylic monomers such as methyl methacrylate, methyl acrylate, acrylic acid, and the like. These monomers may be randomly polymerized with the conjugated diene, may be polymerized to form blocks, or may be grafted onto a conjugated polymer.

The starting polymer may have a weight average molecular weight (Mw) within a range of from 1,000 to 400,000, preferably from 5,000 to 300,000, more preferably from 10,000 to 200,000 and even more preferably from 50,000 to 175,000. For purposes of this invention, molecular weights are apparent molecular weights as measured by gel permeation chromatography (GPC) relative to a polystyrene standard. GPC molecular weight determinations can be performed using an Agilent 1100 series liquid chromatograph equipped with two Polymer Laboratories PLgel 5 micrometer Mixed-C columns connected in series and an Agilent G1362A refractive index detector, or equivalent device, with tetrahydrofuran (THF) flowing at a rate of 1 mL/min and heated to a temperature of 35° C. as the eluent.

The starting polymer of particular interest is a random, block or graft copolymer of butadiene and at least one vinyl aromatic monomer. A "vinyl aromatic" monomer is an aromatic compound having a polymerizable ethylenically unsaturated group bonded directly to a carbon atom of an aromatic ring. Vinyl aromatic monomers include unsubstituted materials such as styrene and vinyl naphthalene, as well as compounds that are substituted on the ethylenically unsaturated group (such as, for example alpha-methylstyrene), and/or are ring-substituted. Ring-substituted vinyl aromatic monomers include those having halogen, alkoxyl, nitro or unsubstituted or substituted alkyl groups bonded directly to a carbon atom of an aromatic ring. Examples of such ring-substituted vinyl aromatic monomers include 2- or 4-bromostyrene, 2- or 4-chlorostyrene, 2- or 4-methoxystyrene, 2- or 4-nitrostyrene, 2- or 4-methylstyrene and 2,4-dimethylstyrene. Preferred vinyl aromatic monomers are styrene, alpha-methyl styrene, para-methyl styrene, and mixtures thereof.

"Vinyl aromatic units" refers to repeating units in the starting material that are formed when a vinyl aromatic monomer is polymerized. A suitable starting butadiene/vinyl aromatic copolymer contains from 5 to 90 percent by weight of polymerized vinyl aromatic monomer units.

The butadiene/vinyl aromatic copolymer may be a random, block (including multiblock such as diblock or triblock types) or graft type of copolymer. Styrene/butadiene block copolymers are widely available in commercial quantities. Those available from Dexco Polymers under the trade designation VECTOR™ are suitable. Styrene/butadiene random copolymers may be prepared, for example, in accordance with the processes described by A. F. Halasa in *Polymer*, Volume 46, page 4166 (2005). Styrene/butadiene graft copolymers may be prepared in accordance with methods described by A. F. Halasa in *Journal of Polymer Science* (Polymer Chemistry Edition), Volume 14, page 497 (1976). Styrene/butadiene random and graft copolymers may also be prepared in accordance with methods described by Hsieh and Quirk in chapter 9 of *Anionic Polymerization Principles and Practical Applications*, Marcel Dekker, Inc., New York, 1996.

The butadiene/vinyl aromatic polymer may also contain repeating units formed by polymerizing monomers other than butadiene and the vinyl aromatic monomer. The most preferred type of butadiene/vinyl aromatic copolymer is a block copolymer containing one or more polystyrene blocks and one or more polybutadiene blocks. Among these, diblock copolymers, and triblock copolymers having a central polybutadiene block and terminal polystyrene blocks, are especially preferred.

The brominating agent is a quaternary ammonium tribromide, a quaternary phosphonium tribromide, or a mixture of two or more thereof. The quaternary ammonium tribromide has a quaternary ammonium group that can be represented by the formula $R_4N^+$, where each R is a hydrocarbon group. The quaternary ammonium tribromide may be a tetraalkylammonium tribromide, in which case each of the R groups is alkyl. The four R groups can all be the same. Alternatively, there may two, three or even four different R groups attached to the nitrogen atom. The R groups each are preferably alkyl having from one to 20 carbon atoms. The R groups more preferably are alkyl groups having from 1 to 8 carbon atoms. Examples of specific quaternary ammonium tribromides include tetramethylammonium tribromide, tetraethylammonium tribromide, tetra(n-propyl)ammonium tribromide, tetra(n-butyl)ammonium tribromide, tetrahexylammonium tribromide, tetraoctylammonium tribromide, tri(hexyl) tetradecyl ammonium tribromide and the like, or mixtures thereof. Tetraethylammonium tribromide is an especially preferred brominating agent The quaternary phosphonium tribromide has a quaternary phosphonium group that can be represented by the formula $R_4P^+$, where each R is as described above with regard to the quaternary ammonium tribromides. As before, the R groups may all be the same or there may two, three or even four different R groups attached to the phosphorus atom. Examples of specific quaternary phosphonium tribromides include tetramethylphosphonium tribromide, tetraethylphosphonium tribromide, tetra(n-propyl)phosphonium tribromide, tetra(n-butyl)phosphonium tribromide, tetrahexylphosphonium tribromide, tetraoctylphosphonium tribromide, tri(hexyl) tetradecyl phosphonium tribromide and the like, or mixtures thereof.

The tribromide brominating agent may be formed in situ, i.e., in the presence of the substrate, by separately adding elemental bromine and the corresponding quaternary ammonium monobromide or quaternary phosphonium monobromide to the organic polymer or solution/dispersion of the organic polymer in the organic solvent, as described in WO 2010/021906.

The organic solvent should be a solvent for the starting polymer and preferably for the quaternary phosphonium tribromide as well. The brominated product may or may not be soluble in the organic solvent. It is preferable that the solvent be substantially immiscible in water. The density of the solvent is different than that of water, preferably higher than that of water, so that the solvent will readily separate from water under somewhat quiescent conditions to form separate phases. The solvent density is preferably at least 1.05, more preferably at least 1.10, g/cc. In addition, the solvent should not react with the starting butadiene polymer, the brominated butadiene polymer or the quaternary ammonium monobromide and tribromide or quaternary phosphonium monobromide or tribromide, as the case may be. It is preferred that the quaternary ammonium or quaternary phosphonium monobromide by-product which forms during the reaction is relatively insoluble in the organic solvent, compared to its solubility in water. The equilibrium distribution coefficient $K_D$ for the extraction of monobromide from solvent into water is the ratio of the quaternary ammonium monobromide salt concentration in the water phase divided by its concentration in the solvent phase. The coefficient $K_D$ may be at least 5 or at least 10 and can be any greater value.

Preferred solvents have boiling temperatures (at atmospheric pressure) of less than 100° C. (especially less than 80° C.), are immiscible in water, are aprotic, do not contain aliphatic carbon-carbon unsaturation and do not contain hydrogen atoms bonded to a tertiary carbon atom. Suitable solvents include ethers such as tetrahydrofuran; various carboxylic acid esters, halogenated alkanes such as carbon tetrachloride, chloroform, dichloromethane, bromochloromethane, dibromomethane, 1,2-dibromoethane and 1,2-dichloroethane; hydrocarbons such as heptane, octane, decane, dodecane, cyclohexane, cyclopentane, cyclooctane and toluene, and halogenated aromatic compounds such as bromobenzene, chlorobenzene and dichlorobenzene. Three especially preferred solvents are dichloroethane, dichloromethane and cyclohexane.

Unreacted and/or excess quaternary ammonium or quaternary phosphonium tribromide remains in the organic solvent at the conclusion of the bromination. In this invention, the organic solvent containing the quaternary ammonium tribromide or quaternary phosphonium tribromide is washed with an aqueous hydrazine solution in an amount sufficient to provide at least 0.25 moles of hydrazine per mole of quaternary ammonium tribromide or quaternary phosphonium tribromide in the organic solvent. In a bromination process as described above, it is unnecessary and even less preferred to separate the organic phase from any aqueous phase present during the bromination step before contacting the organic phase with the aqueous hydrazine solution, although that can be done if wanted.

The washing step is performed by combining the organic solvent containing the quaternary ammonium tribromide or quaternary phosphonium tribromide with an aqueous hydrazine solution. The combined materials preferably are agitated to promote good contact between the phases and in particular to facilitate contact between the tribromide(s) with the hydrazine. The washing step may be performed, for example, in an agitated vessel; by passing the combined materials through a static or active mixing device such as a static mixer or rotovaporator, by ultrasonic mixing, or other convenient technique.

Enough of the aqueous hydrazine solution is combined with organic phase to provide at least 0.25 moles of hydrazine per mole of the quaternary ammonium tribromide or quaternary phosphonium tribromide in the organic phase. A preferred amount is at least 0.4 moles, at least 0.475 or at least 10.5 mole, on the same basis. An excess of hydrazine may be provided but a large excess, such as more than 0.75 moles per mole of tribromide, are generally unnecessary. In addition, it is preferred that aqueous hydrazine solution by itself or in combination with one or more other aqueous phases as may be present (such as an aqueous phase from the bromination reaction) contains enough water to dissolve the quaternary ammonium and/or quaternary phosphonium monobromide formed in this step.

The concentration of hydrazine in the aqueous solution may be, for example, at least 1 wt.-%, at least 5 wt.-%, at least 10 wt.-%, at least 20 wt.-% or at least 30 wt.-% based on the combined weight of water and hydrazine, and up to the saturation limit, preferably up to 50 wt.-%.

The temperature during this step may vary widely, such as from 0° C. to 100° C. The lower temperature may be at least 10° C. or at least 15° C. and an upper temperature may be up to 60° C., up to 50° C. or up to 40° C. This step can be performed at atmospheric, subatmospheric or superatmospheric pressure, the pressure and temperature preferably being chosen together so the water and organic solvent remain in the liquid state. The time of reaction may vary from 5 seconds to 5 hours or longer, with a preferred time being up to one hour or up to 30 minutes. The reaction preferably is performed under non-oxidizing conditions, such as under an inert atmosphere such as a nitrogen, argon or helium atmosphere. The reaction mixture and/or its constituents can be sparged with such an inert gas to remove dissolved oxygen.

The hydrazine and residual and/or excess quaternary ammonium or quaternary phosphonium tribromide react to produce nitrogen, hydrobromic acid, and a quaternary ammonium monobromide or quaternary phosphonium monobromide corresponding to the quaternary ammonium tribromide or quaternary phosphonium tribromide. By "corresponding", it is meant the quaternary ammonium or the quaternary phosphonium group is the same as between the monobromide and the tribromide, i.e., the R groups are the same in each case. Tribromide consumption is accompanied by a change of coloration in the organic phase, from orange or red to clear (white). Thus, the progress of the reaction can be followed visually or via colorimetric methods. The pH of the aqueous phase drops as hydrobromic acid is produced, typically to less than 1, so pH measurement methods can be used to follow the reaction. The evolution of nitrogen gas also can be used to follow the course of the reaction, as can spectroscopic methods such as Raman spectroscopy.

The foregoing reaction products partition strongly to the aqueous phase or may evolve as a gas (as in the case of nitrogen). In step b) of the process, the aqueous phase containing hydrobromic acid and the quaternary ammonium or quaternary phosphonium monobromide is separated from the organic phase, which in the bromination process described above, may contain dissolved brominated polymer. As the phases are typically immiscible, separation can be achieved by allowing the phases to separate, such as by exposing them to quiescent conditions, and then removing one phase from the other using any convenient technique for separating immiscible liquid phases, including decantation, the use of separation funnels and like apparatus, centrifugation and the like. The aqueous phase is usually lighter and forms an upper layer upon phase separation.

Brominated polymer is optionally recovered from the organic phase. Various methods are useful to achieve this. The brominated polymer can be isolated from the mixture via various solvent stripping methods, by extraction methods, or by precipitating it from the solution using an anti-solvent. Examples of such anti-solvents include lower alcohols such as methanol, ethanol and 1-propanol, 2-propanol, n-butanol, and t-butanol. In one suitable recovery method, the solution is formed into fine droplets. The solvent is thermally stripped from the droplets to form particles of the brominated product. Before or after the thermal stripping step, the droplets or particles are washed in water. In another suitable recovery method, the solution is formed into droplets and sprayed onto a heated, mechanically agitated bed of seed particles. The droplets contact the seed particles, where the solvent is driven off and the precipitated brominated product forms a shell around the individual seed particles, thereby increasing their diameter. The isolated brominated polymer may be purified to remove residual bromine, brominating agent, solvent and by-products as desired or needed for a particular application.

Hydrobromic acid in the aqueous phase can be neutralized with a quaternary ammonium hydroxide or quaternary phosphonium hydroxide to produce a corresponding quaternary ammonium monobromide or quaternary phosphonium monobromide. By neutralizing the hydrobromic acid in this way, bromine is recovered in the form of the quaternary ammonium monobromide or quaternary phosphonium monobromide.

Alternatively, the hydrobromic acid can be neutralized or otherwise consumed if desired by combining the aqueous phase with one or more different bases or other materials such as epoxides and lactones that react with hydrobromic acid.

Preferably, the quaternary ammonium or quaternary phosphonium hydroxide used in the neutralization step has same ammonium or phosphonium ion structure as the quaternary ammonium or quaternary ammonium monobromide in the aqueous phase, i.e., the R groups of the $R_4N^+$ or $R_4P^+$ ions in each case are the same. Thus, for example, if the quaternary ammonium bromide in the aqueous phase is tetraethylammonium monobromide, it is preferred to use tetraethylammonium hydroxide to neutralize the hydrobromic acid. This has the benefit of producing more of the same quaternary ammonium or quaternary phosphonium monobromide compound instead of forming mixtures. This in turn facilitates recycling the monobromide back into the bromination process. The monobromide so generated can be contacted with additional bromine to regenerate the corresponding tribromide, which in turn can be used in subsequent bromination reactions.

Suitable conditions for the neutralization reaction are generally as described with respect to step a), i.e., the washing step. The quaternary ammonium or quaternary phosphonium hydroxide is conveniently provided in the form of an aqueous solution that can contain the hydroxide compound in any concentration up to its saturation limit in water; such an aqueous solution may contain, for example, at least 1 wt.-% at least 5 wt.-%, at least 10 wt.-%, at least 20 wt.-% of the hydroxide compound. It is preferred to provide enough of the aqueous solution to provide at least 0.5 mole, at least 0.75 mole, at least 0.9 mole or at least one mole of the quaternary ammonium or quaternary phosphonium hydroxide per mole of hydrobromic acid. An excess of the hydroxide may be used, but if so, it is preferred to use no more than a 10% or no more than a 5% molar excess.

In yet another preferred embodiment, the process further comprises e) a step of combining a quaternary ammonium monobromide or quaternary phosphonium monobromide obtained in step a) and/or step d) with elemental bromine to regenerate a quaternary ammonium tribromide or quaternary phosphonium tribromide. The process may further comprise a further step f) of brominating an organic polymer having aliphatic carbon-carbon double and/or triple bonds by contacting the organic polymer with a regenerated quaternary ammonium tribromide or quaternary phosphonium tribromide obtained in step e). Suitable conditions for performing these steps are described, above and in, for example, U.S. Pat. No. 7,851,558, WO 2008/021417, WO 2008/021418, WO 2009/126531 and WO 2010/021906.

EXAMPLES

The following examples are provided to illustrate the invention, but not to limit the scope thereof. All parts and percentages are by weight unless otherwise indicated.

Example 1

A jacketed 2-L reactor equipped with a circulator to control reactor temperature, an overhead stirrer, a nitrogen inlet and a condenser with fluid chilled by a circulator is charged with 476 mL of a 50 wt. % aqueous solution of tetraethylammonium monobromide (TEAB) (1.27 mol of TEAB) and equilibrated at 10° C. A solution of 22.18 g (0.139 mole) bromine in 500 mL of dichloromethane (DCM) is pumped into the reactor at a rate of 15-25 mL/min. The pump line is rinsed into the reactor with an additional 500 mL DCM. The circulator is shut off and the reaction mixture stirred for one hour at room temperature to produce a biphase mixture with a yellow top aqueous layer and red/orange bottom organic layer. The coloration is indicative of tetraethylammonium tribromide (TEATB) formation.

The biphase mixture is transferred to a jacketed 5-L reactor equipped with a circulator to control reactor temperature, an overhead stir, a nitrogen inlet and a condenser with fluid chilled by a circulator, and equilibrated at 20° C. Hydrazine solution (35 wt. %, 6.35 g, 0.070 mol hydrazine) was added to the reactor over 5 minutes with stirring. The mixture turns from red/orange to colorless within 12 minutes after the addition is completed, and nitrogen gas is generated. Upon standing, the mixture again separates into an upper aqueous layer and a bottom organic layer, which are separated.

TEATB in the bottom organic layer is undetectable by Raman spectroscopy, indicating that the hydrazine has completely quenched TEATB from the organic phase. The color of the organic phase (red-orange or colorless) can be used as a general indication of the quench reaction.

The aqueous layer contains TEAB and HBr as reaction products. It has a pH less than 1. 10 mL of the aqueous layer, containing a theoretical amount of 0.0049 mmol HBr, is charged into a glass vial at room temperature. 2.1 mL of a 35 wt. % aqueous solution of tetraethylammonium hydroxide (TEAOH) (0.0051 mmol TEAOH, pH 6-6.4) is added to the vial. After stirring for 5 minutes at room temperature, an aliquot of the reaction mixture is removed. The pH is measured as about 4.5 using pH paper, indicating that HBr has been neutralized by the TEAOH to form TEAB plus water. The pH rises to 13.5 after an additional 0.1 mL of TEAOH solution is added to the reaction mixture.

Example 2

536.6 g of a 50 wt. % aqueous TEAB solution (1.27 moles TEAB) is cooled to 0° C. in a 2-L jacketed mixing vessel. A solution of 179.0 g (1.12 moles) of bromine in 300 mL of DCM is pumped into the stirred reaction vessel over a 14-minute period. An additional 100 mL of DCM is used to rinse the pump and lines and added into the reaction vessel. The reactor contents are stirred for 43 minutes to produce TEATB, which migrates to the organic phase. Stirring is discontinued and the phases are allowed to separate to produce a red bottom organic layer and a yellow upper aqueous layer.

80.1 g of a styrene-butadiene-styrene triblock copolymer (80.5% vinyl) is dissolved in 1 liter of dichloromethane a 5-L jacketed reactor equipped with a circulator and condenser chiller unit. The temperature is set to 0° C. and the red bottom TEATB-containing organic layer is pumped into the 5-L reactor over 3 minutes while stirring. The pump is rinsed with another 100 mL of DCM, which is also transferred to the 5-L reactor. The resulting reaction mixture is heated at reflux (40° C.) for 2.5 hours. The aqueous phase from the 2-L reactor is then pumped into the 5-L reactor, followed by a rinse of 50 mL fresh DCM. The resulting two-phase mixture is heated at 40° C. with stirring for an additional 2.5 hours and then cooled to 20° C.

A 35% by weight hydrazine solution in water (22.9 g, 0.25 mole hydrazine) is then added to the stirred reaction mixture. The red color dissipates to nearly colorless. Stirring is discontinued and the phases permitted to separate into an organic phase and an aqueous quench phase. The aqueous quench phase contains 50 wt. % TEAB (90.5% of theoretical) and 0.5% residual hydrazine by proton NMR.

416 g of the aqueous quench phase is combined with 187.5 g of a 35% solution of tetraethylammonium hydroxide in water. This neutralizes the HBr to form a neutralized aqueous quench phase containing 51 wt. % TEAB and having a pH of 7.0.

The organic phase is washed twice with about 450 mL of dionized water. The washes are separated from the organic phase and kept separated. The first wash has a pH of 1.0 and contains 4.8% by weight TEAB and negligible hydrazine; the second has a pH of 3.7 and contains no TEAB or hydrazine.

The brominated polymer is precipitated from the washed organic phase by adding 2-propanol. The precipitated polymer is dried to remove residual solvent. 98.8% of the butadiene units are brominated, as determined by proton NMR. Its 5% weight loss temperature is 257° C. It's isothermal weight loss temperature at 186° C. is 0.22 wt. %.

Example 3

537.6 g of the neutralized aqueous quench phase from Example 2 is cooled to 0° C. in a 2-L jacketed mixing vessel. A solution of 179.4 g (1.12 moles) of bromine in 300 mL of DCM is pumped into the stirred reaction vessel over a 14-minute period. An additional 100 mL of DCM is used to rinse the pump and lines and added into the reaction vessel. The reactor contents are stirred for 60 minutes to produce TEATB, which migrates to the organic phase. Stirring is discontinued and the phases are allowed to separate to produce a red bottom TEATB-containing organic layer and a yellow upper aqueous layer.

80.1 g of a styrene-butadiene-styrene triblock copolymer (80.5% vinyl) is dissolved in 1 liter of dichloromethane in a 5-L jacketed reactor equipped with a circulator and condenser chiller unit. The temperature is set to 0° C. and the red bottom TEATB-containing organic layer is pumped into the 5-L reactor over 2 minutes while stirring. The pump is rinsed with another 100 mL of DCM, which is also transferred to the 5-L reactor. The resulting reaction mixture is heated at reflux (40° C.) for 2.5 hours. The aqueous phase from the 2-L reactor is then pumped into the 5-L reactor, followed by a rinse of 50 mL fresh DCM. The resulting two-phase mixture is heated at 40° C. with stirring for an additional 2.5 hours and then cooled to 20° C.

A 35% by weight hydrazine solution in water (1.7 g, 0.018 mole hydrazine) is then added to the stirred reaction mixture. The red color dissipates to nearly colorless. Stirring is discontinued and the phases permitted to separate into an organic phase and an aqueous quench phase. The aqueous quench phase contains 29.5 wt. % TEAB (96% of theoretical) and 0.004% residual hydrazine by proton NMR. Its pH is 0.23.

The organic phase is washed twice with about 400 mL of deionized water. The washes are separated from the organic phase and kept separated. The first wash has a pH of 2.0; it contains 0.78% by weight TEAB and no measurable hydrazine by proton NMR. The second wash has a pH of 3.5 and contains no TEAB or hydrazine by proton NMR. The brominated polymer is precipitated from the washed organic phase by adding 2-propanol. The precipitated polymer is dried to remove residual solvent. 98.8% of the butadiene units are brominated, as determined by proton NMR.

The foregoing experiment is repeated and the recovered brominated polymers from each run are combined for analysis. The 5% weight loss temperature of the combined material is 257° C.; its isothermal weight loss temperature at 186° C. is 0.22 wt. %. 95.8% of the butadiene units are brominated.

What is claimed is:
1. A process for removing a quaternary ammonium tribromide or quaternary phosphonium tribromide from an organic solvent, comprising
   a) a step of washing an organic solvent containing the quaternary ammonium tribromide or quaternary phosphonium tribromide with an aqueous hydrazine solution in an amount sufficient to provide at least 0.25 moles of hydrazine per mole of quaternary ammonium tribromide or quaternary phosphonium tribromide in the organic solvent, to produce an aqueous phase containing hydrobromic acid and a quaternary ammonium monobromide or quaternary phosphonium mono- bromide corresponding to the quaternary ammonium tribromide or quaternary phosphonium tribromide and then b) a step of separating the aqueous phase from the organic solvent.

2. The process of claim 1 wherein the organic solvent contains a dissolved brominated polymer and the process further comprises a step c) of, after step a), recovering the brominated polymer from the organic solvent.

3. The process of claim 1, which further comprises a step of combining a quaternary ammonium monobromide or quaternary phosphonium monobromide obtained in step a) with elemental bromine to regenerate a quaternary ammonium tribromide or quaternary phosphonium tribromide.

4. The process of claim 3, further comprising a step f) of brominating an organic polymer having aliphatic carbon-carbon double and/or triple bonds by contacting the organic polymer with the regenerated quaternary ammonium tribromide or quaternary phosphonium tribromide obtained by combining a quaternary ammonium monobromide or quaternary phosphonium monobromide obtained in step a) with elemental bromine.

5. The process of claim 1, further comprising, after step a), a step d) of neutralizing hydrobromic acid in the aqueous phase with a quaternary ammonium hydroxide or quaternary phosphonium hydroxide to produce a corresponding quaternary ammonium monobromide or quaternary phosphonium monobromide.

6. The process of claim 5, which further comprises e) a step of combining a quaternary ammonium monobromide or quaternary phosphonium monobromide obtained in step d) with elemental bromine to regenerate a quaternary ammonium tribromide or quaternary phosphonium tribromide.

7. The process of claim 6, further comprising a step of brominating an organic polymer having aliphatic carbon-carbon double and/or triple bonds by contacting the organic polymer with a regenerated quaternary ammonium tribromide or quaternary phosphonium tribromide obtained by combining a quaternary ammonium monobromide or quaternary phosphonium monobromide obtained in step d) with elemental bromine.

8. The process of claim 1, wherein the solvent is one or more of carbon tetrachloride, chloroform, dichloromethane, bromochloromethane ($CH_2BrCl$), dibromomethane, 1,2-dichloroethane, cyclohexane, toluene, bromobenzene, chlorobenzene and dichlorobenzene.

9. The process of claim 1, wherein the quaternary ammonium tribromide or quaternary phosphonium tribromide is at least one of phenyltrimethylammonium tribromide, benzyltrimethylammonium tribromide, tetramethylammonium tribromide, tetraethylammonium tribromide, tetrapropylammonium tribromide and tetra-n-butylammonium tribromide.

10. The process of claim 2, wherein the dissolved brominated polymer is a bromine butadiene homopolymer or a brominated random, block or graft copolymer of butadiene and at least one vinyl aromatic monomer.

11. The process of claim 10, wherein the dissolved brominated polymer is a block copolymer of butadiene and styrene.

12. The process of claim 1, wherein in step a) the organic solvent containing the quaternary ammonium tribromide or quaternary phosphonium tribromide is washed with an amount of the aqueous hydrazine solution sufficient to provide at least 0.5 moles of hydrazine per mole of quaternary ammonium tribromide or quaternary phosphonium tribromide in the organic solvent.

* * * * *